(12) United States Patent
Lee

(10) Patent No.: US 7,465,782 B2
(45) Date of Patent: *Dec. 16, 2008

(54) METHOD FOR MAKING POLYBENZOBISOXAZOLE CONTAINING FIBER

(75) Inventor: Kiu-Seung Lee, Philadelphia, PA (US)

(73) Assignee: E.I Du Pont De Nemours & Company, Wilmington, DE (US)

( * ) Notice: Subject to any disclaimer, the term of this patent is extended or adjusted under 35 U.S.C. 154(b) by 583 days.

This patent is subject to a terminal disclaimer.

(21) Appl. No.: 11/180,239

(22) Filed: Jul. 13, 2005

(65) Prior Publication Data

US 2007/0013102 A1    Jan. 18, 2007

(51) Int. Cl.
*C08F 6/10* (2006.01)
*C08F 6/12* (2006.01)
*C08G 73/22* (2006.01)

(52) U.S. Cl. ........................ 528/486; 528/487; 528/335; 528/341; 528/422; 528/503; 528/272

(58) Field of Classification Search ................. 528/486, 528/487, 335, 336, 341, 422, 503, 272
See application file for complete search history.

(56) References Cited

U.S. PATENT DOCUMENTS

| | | | |
|---|---|---|---|
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 4,423,202 A | 12/1983 | Choe | |
| 5,151,490 A | 9/1992 | Harris et al. | |
| 6,153,350 A | 11/2000 | Sezi et al. | |

OTHER PUBLICATIONS

T. I. Bair et al., "Poly(1,4-phenyleneterephthalamides) Polymerization and Novel Liquid-Crystalline Solutions", Macromolecules, vol. 10, No. 6, Dec. 1977, pp. 1396-1400.

*Primary Examiner*—Duc Truong
(74) *Attorney, Agent, or Firm*—Andrew Golian

(57) ABSTRACT

A method of making polybenzobisoxazole containing fiber by use of a non-polybenzobisoxazole polymer, hydroxylating the polymer, forming the polymer into a fiber and heating the fiber wherein ring closure occurs in the hydroxylated polymer.

10 Claims, No Drawings

METHOD FOR MAKING POLYBENZOBISOXAZOLE CONTAINING FIBER

BACKGROUND OF THE INVENTION

1. Field of the Invention

This invention is directed to a novel process for making polybenzobisoxazole containing fibers. This is accomplished by first forming a non-polybenzobisoxazole fiber and converting repeat units of the fiber polymer to a polybenzobisoxazole.

2. Description of Related Art

Fibers formed from rod-like polymers are commonly used in a variety of applications including ballistics, ropes and cables, and cut resistant apparel. Polybenzobisoxazole polymers provide excellent physical properties due to their rod-like structure.

Fibers from rod-like polymers are typically formed by extruding a polymer solution through a spinneret. Due to the limited solubility of (cis-polybenzobisoxazole polymers) (c-PBO) such as poly(benzo[1,2 d:5,4-d']bisoxazole-2,6-diyl-1,4-phenylene), fibers produced from such polymers are typically spun from strong mineral acids such as polyphosphoric acid (PPA). Residual polyphosphoric acid present in the fiber over time can cause the physical properties of the fiber to degrade.

What is therefore needed is a method of producing fibers such as cis isomers of polybenzobisoxazole polymers without the use of polyphosphoric acid.

BRIEF SUMMARY OF THE INVENTION

This invention relates to a method of making polybenzobisoxazole containing fiber comprising the steps of:

a) forming a polymer solution comprising a solvent and a polymer having the structure:

STRUCTURE I $$\left[ \begin{array}{c} H \\ | \\ N \end{array} - AR_1 - \begin{array}{c} H \\ | \\ N \end{array} - \begin{array}{c} O \\ || \\ C \end{array} - AR_2 - \begin{array}{c} O \\ || \\ C \end{array} \right]$$

wherein
$Ar_1$ is

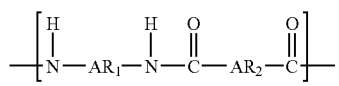

$Ar_2$ is

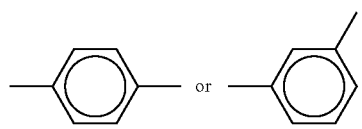

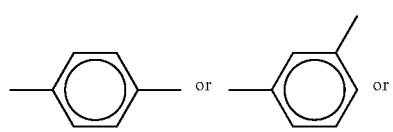

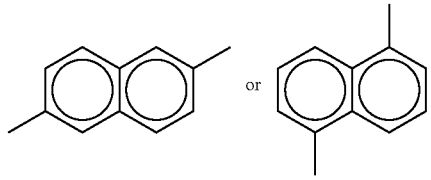

b) contacting the polymer solution of a) with a oxidizing agent in the presence of an alkyl carboxylic acid which provides oxygen atoms to hydroxylate at least a portion of $Ar_1$, in forming a hydroxylated polymer with ortho hydroxyl groups, c) forming a fiber from the hydroxylated polymer of step b), d) heating the fiber to form ring closure of at least a portion of ortho-hydroxyl groups.

DETAILED DESCRIPTION OF THE INVENTION

The invention relates to a method of making polybenzobisoxazole containing fiber by first producing an aromatic polyamide fiber and subsequently converting the aromatic polyamide fiber into a polybenzobisoxazole containing fiber.

The initial step in the reaction procedure involves forming a solution of the polymer of Structure I which is as defined in the Summary of the Invention. Typical solvents in forming the solution include but are not limited to sulfuric acid, polyphosphoric acid, methane sulfonic acid, n-methylpyrrolidinone, dimethylformamide, dimethylacetamide, and tetrahydrofuran. Preferably, the solvent is sulfuric acid or n-methylpyrrolidinone. Most preferably, the solvent is sulfuric acid.

The polymers of Structure I are known in the art and can be formed by reaction an aromatic diamine and an aromatic diacid.

Suitable diamine monomers include but are not limited to p-phenylene diamine, m-phenylene diamine, 4,4'-diphenyldiamine, 3,3'-diphenyldiamine, 3,4'-diphenyldiamine, 4,4'-oxydiphenyldiamine, 3,3'-oxydiphenyldiamine, 3,4'-oxydiphenyldiamine, 4,4'-sulfonyldiphenyldiamine, 3,3'-sulfonyldiphenyldiamine, 4,4'-sulfonyldiphenyldiamine, 3,3'-sulfonyldiphenyldiamine, and 3,4'-sulfonyldiphenyldiamine. Preferably, the aromatic diamine is m-phenylene diamine or p-phenylene diamine. Suitable diacid monomers include but are not limited to terephthalic acid, isophthalic acid, 2,6-naphthalenedicarboxylic acid, 4,4'-oxydibenzoic acid, 3,3'-oxydibenzoic acid, 3,4'-oxydibenzoic acid, 4,4'-sulfonyldibenzoic acid, 3,3'sulfonyldibenzoic acid, 3,4'-sulfonyldibenzoic acid, 4,4'-dibenzoic acid, 3,3'-dibenzoic acid, and 3,4'-dibenzoic acid. Preferably, the diacid monomer is terephthalic acid, isophthalic acid, or 2,6-naphthalenedicarboxylic acid, with terephthalic acid being the most preferred.

The following structural representations are where Ar1 is as defined:

STRUCTURE Ia

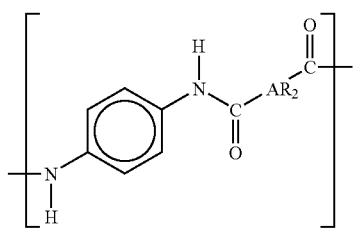

STRUCTURE Ib

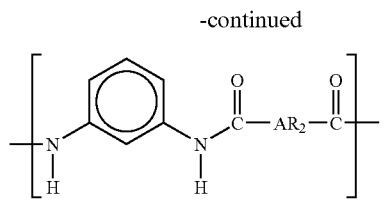

A preferred structure I polymer has the structure:

STRUCTURE Ic

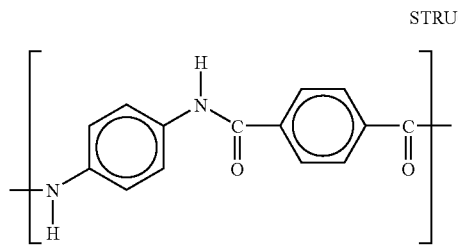

This structure Ic is commonly referenced as PPD-T.
A further preferred structure I polymer has the structure:

STRUCTURE Id

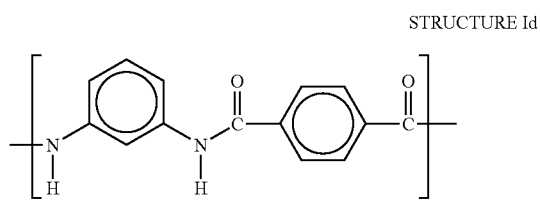

This structure Id is commonly referenced as MPD-T.

A further step in the reaction procedure comprises hydroxylating $Ar_1$ groups of Structure I resulting in ortho hydroxyl groups. The hydroxylating step involves the use of an alkyl carboxylic acid and an oxidizing agent. Suitable alkyl carboxylic acids include formic acid, acetic acid, propanoic acid, butanoic acid, and the like. Preferably the alkyl carboxylic acid is formic acid or acetic acid. Most preferably the alkyl carboxylic acid is acetic acid. Alkyl carboxylic acids have a dissociation constant less than that of sulfuric acid and contain the oxygen necessary for the hydroxylation.

Suitable oxidizing agents include nitrosylsulfuric acid, lead tetraacetate, and sodium nitrate. Preferably, the oxidizing agent is nitroxylsulfuric acid.

Preferably, the oxidizing agent is added to the polymer solution containing the acid with mechanical stirring under an inert atmosphere. By inert atmosphere it is meant an atmosphere that is essentially unreactive. Suitable inert atmospheres include but are not limited to nitrogen, helium, and noble gases.

With hydroxylation of $Ar_1$ groups of Structures I, the following will be present in the polymer:

STRUCTURE II TRANS

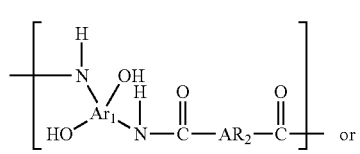 or

STRUCTURE II CIS

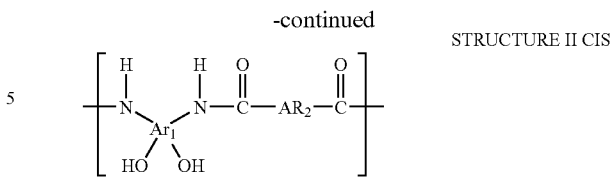

The corresponding hydroxylated structures for Ia, Ib, Ic and Id are as follows

STRUCTURE IIa

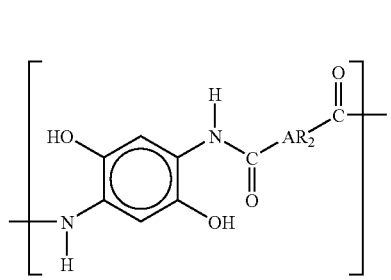

STRUCTURE IIb

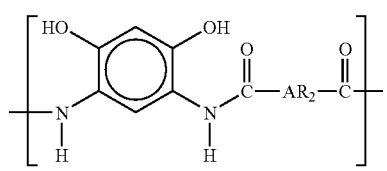

STRUCTURE IIc

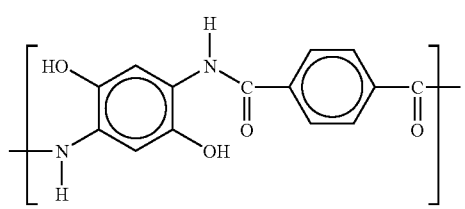

STRUCTURE IId

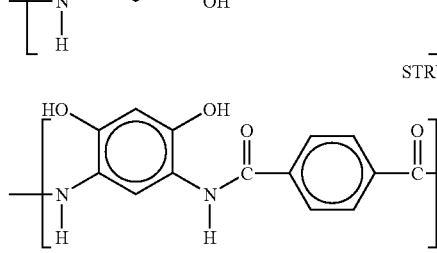

It is understood that in the typical hydroxylation step that only a portion of the $Ar_1$ groups will be hydroxylated. Accordingly, in most instances, unreacted $Ar_1$ groups will be present in the final polymer.

A further step in the method involves formation of a fiber from the polymer wherein $Ar_1$ groups contain ortho hydroxyl groups (as well as the polymer containing unreacted $Ar_1$ groups). The step may be undertaken with known and conventional methods in formation of aromatic polyamide fibers. This step can be done by any technique that spins fibers from solution, such as wet spinning, dry-jet wet (air-gap) spinning, jet-attenuated spinning, centrifugal spinning, electro-spinning, and others. Examples of the most useful methods for the spinning of fibers of the present invention can be found in U.S. Pat. Nos. 3,869,429, 3,869,430, and 3,767,756. After fiber formation the hydroxylated polymer fibers can be processed by methods known in the art to reduce the amount of residual solvent and improve the mechanical properties of the fiber such as washing, pH modification, heat treatment, drying, and crystallization. Preferably, the fibers are coagulated in a water bath, washed in a second water bath, neutralized in a neutralization bath and dried.

The further step in the reaction procedure employs heating of the formed fiber. The heating step results in ring closure of a portion of the $Ar_1$ groups containing orth hydroxyl groups. A suitable temperature range for convenience is from 170 to 280 degrees Celsius, preferably 185 to 250 degrees Celsius, with the most preferred temperature being between 200 and 240 degrees Celsius. Typical heating times range from 5 to 60 seconds Accordingly, an oxazole containing polymer fiber is formed.

It is understood that the fiber during heating may be subjected to tension which is known in fiber formation. A suitable tension is in a range from 1.0 to 18.0 grams per denier (gpd) with 2.0 to 10.0 gpd being preferred and 2.5 to 5.0 gpd being most preferred.

As a result of ring closure the fiber will contain repeating units of the following structure:

STRUCTURE III TRANS

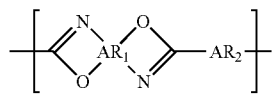

STRUCTURE III CIS

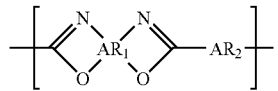

The corresponding ring closed structures which result from structures II a, b, c and d are as follows:

STRUCTURE IIIa

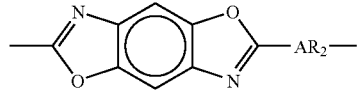

STRUCTURE IIIb

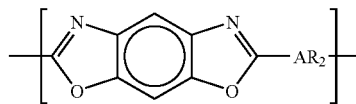

STRUCTURE IIIc

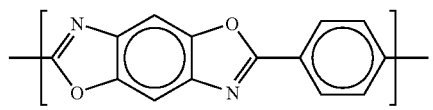

STRUCTURE IIId

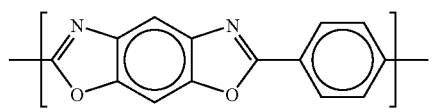

It is understood in the heating step that typically only a portion of the $Ar_1$ groups containing ortho hydroxyl groups will result in ring closure, i.e. an oxazole containing polymer. However, it is believed that at least 30% and generally more than 50% of the ortho hydroxyl groups will be converted.

Therefore, in the present invention the final polymer in the fiber will typically contain repeating units at least of structure III and at least one of structure I and structure II. However it is within the scope of the invention that structure III is present with only one of structure I or structure II.

Also for the reaction procedure the designation in use of Ia will result in IIa for hydroxylation and IIIa for ring closure. Similarly the b, c and d designations are applicable in a species of starting polymer proceeding to hydroxylation and the proceeding to ring closure.

As previously set forth, preferred starting materials of structure Ic or Id are PPD-T or MPD-T. The following represents a schematic representation of the reaction procedure:

Trans:

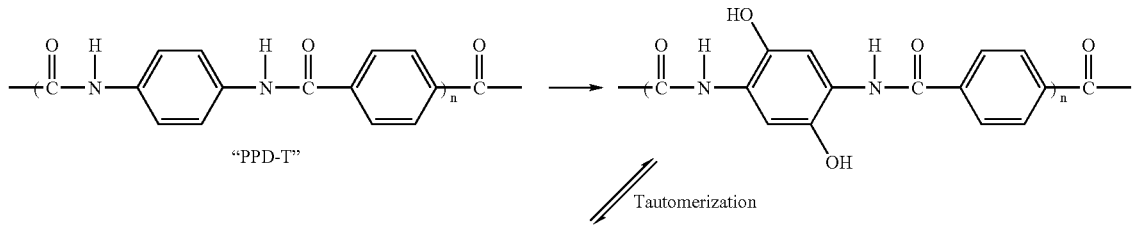

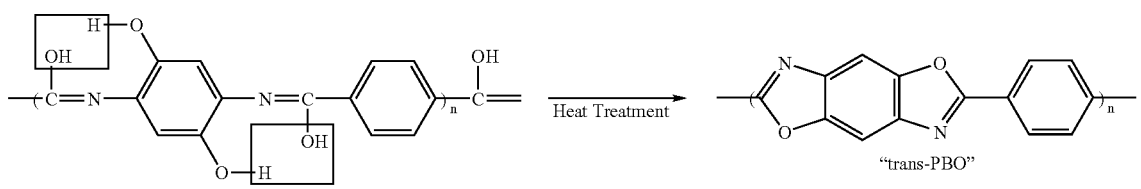

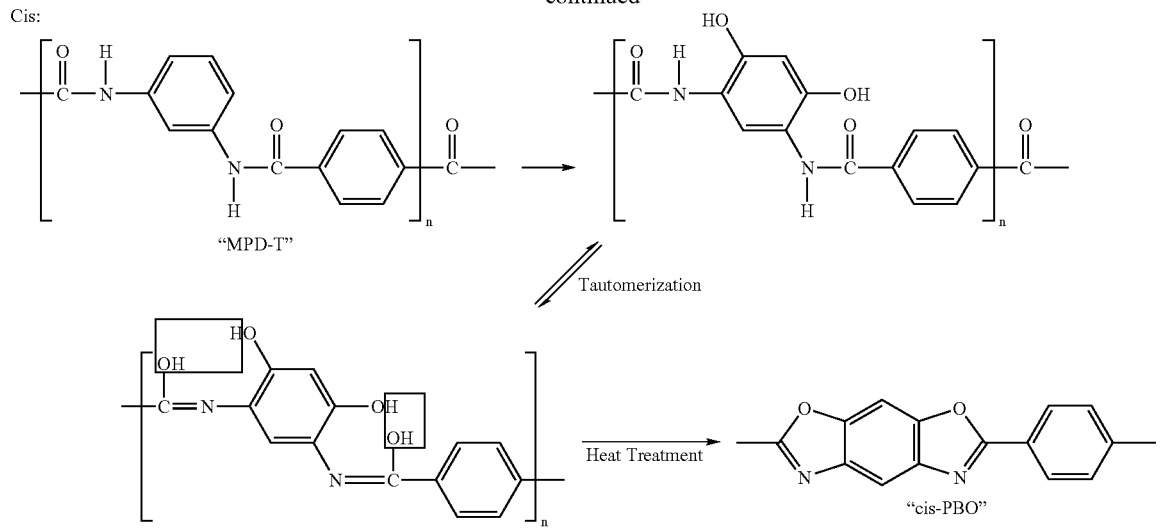

"MPD-T" → Tautomerization → Heat Treatment → "cis-PBO"

Test Methods

Tenacity, elongation, and modulus are determined according to ASTM D 3822. Tenacity (breaking tenacity), elongation to break, and modulus of elasticity are determined by breaking test fibers on an Instron tester. Tenacity is reported as breaking stress divided by linear density. Modulus is reported as the slope of the initial stress/strain curve converted to the same units as tenacity. Elongation is the percent increase in length at break.

Inherent Viscosity is the ratio of the natural logarithm of the relative viscosity to the mass concentration of the polymer as measured with respect to a solution of 0.5 g of the polymer in 100 ml of concentrated sulfuric acid at 25° C.

Relative Viscosity is the ratio of the viscosity of the polymer in solution to that of the solvent expressed as the time of efflux of the solution divided by the time of efflux of the solvent at constant temperature.

In the following examples are parts and percentages are by weight unless otherwise indicated.

EXAMPLE 1

A reaction kettle equipped with nitrogen inlet/outlet and a basket stirrer driven by high pressure air was set-up in silicone oil bath. 3.0 grams of PPD-T [p-phenyleneterephthalamide] of inherent viscosity of 6.0 and 100 grams of sulfuric acid were added under nitrogen and the mixture was gradually heated to about 70 degrees Celsius to form a solution. To this solution was added 1.68 grams of nitrosylsulfuric acid (95%) and 1 gram of acetic acid. The mole % of nitrosulfuric acid (NSA) on the basis of NSA and PPD-T was 50.0%. The solution was stirred for 12 hours at 70 degrees Celsius under nitrogen. The color of the solution changed to bluish green from yellow as a result of the hydroxylation reaction. The resulting solution was precipitated in aqueous medium at room temperature, washed five times, each time with about 200 ml water, and finally neutralized to a pH of about 9 with a dilute sodium hydroxide solution. The yellowish brown precipitated polymer was filtered and dried in vacuum oven at 120° C. overnight under nitrogen. A dried but not heat treated sample was sent for elemental analysis for C, H, N, and O by standard combustion method. The results are as follows:

| | Elements | | | |
|---|---|---|---|---|
| | C | H | O | N |
| PPD-T | 69.21 | 4.14 | 11.81 | 11.60 |
| Sample | 70.21 | 4.24 | 13.67 | 11.58 |

From the following calculation, it was determined that about 15% of the $Ar_1$ groups (as defined for PPD-T) were hydroxylated.

(O content of the sample−O content of PPD-T control)/(O content of 100% Substitution−O content of PPD-T control)

$(13.67-11.81)/(23.68-11.81) \times 100 = (1.86/11.87) \times 100 = 15.67\%$

EXAMPLES 2-7

20.4 kg of 100% sulfuric acid and 0.21 kg of acetic acid were frozen in a mixer equipped with twin spiral blades under nitrogen. 4.9 kg of PPD-T polymer were added to this frozen sulfuric acid slurry at −20 degrees Celsius. The mixture was continuously stirred while the temperature was gradually increased to about 82 degrees Celsius over a period of 15 minutes. Various amounts of nitrosylsulfuric acid were added to the solution as shown in Table 1. The mixture was stirred for 2 additional hours with vigorous mixing at 82° C. under nitrogen. The polymer solution (dark green color) was spun into fiber by standard air-gap spinning as described in U.S. Pat. No. 3,819,587 to form a 400 denier yarn of 1.5 dpf filaments. The yarn was then heat treated to effect ring closure at a temperature of 185 degrees Celsius for 15 minutes.

TABLE 1

| Examples | Mole % of NSA/PPD-T | Yarn Inherent | Tenacity (gpd) | Elongation (%) | Modulus (gpd) |
|---|---|---|---|---|---|
| 2 | 14.1 | 7.06 | 19.3 | 3.61 | 520 |
| 3 | 21.1 | 6.62 | 20.3 | 3.70 | 550 |
| 4 | 28.3 | 6.84 | 19.1 | 3.65 | 577 |

TABLE 1-continued

| Examples | Mole % of NSA/PPD-T | Yarn Inherent | Tenacity (gpd) | Elongation (%) | Modulus (gpd) |
|---|---|---|---|---|---|
| 5 | 35.5 | 5.97 | 22.1 | 3.85 | 609 |
| 6 | 42.4 | 5.95 | 22.3 | 3.79 | 634 |
| 7 | 0 | 5.98 | 17.4 | 2.72 | 529 |

In Table 1 mole % for PPD-T means the repeating formula structure Ic.

What is claimed is:

1. A method of making polybenzobisoxazole containing fiber comprising the steps of:
   a) forming a polymer solution comprising a solvent and a polymer having the structure:

STRUCTURE I

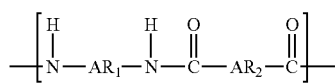

wherein
$Ar_1$ is

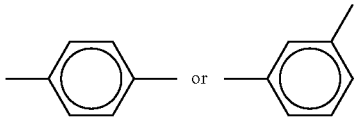

$Ar_2$ is

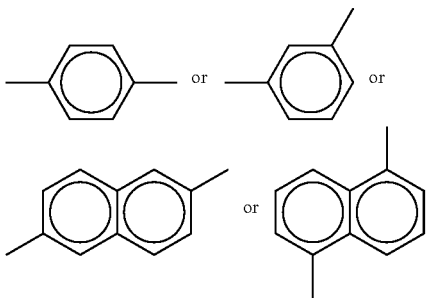

b) contacting the polymer solution of a) with a oxidizing agent in the presence of an alkyl carboxylic acid which provides oxygen atoms to hydroxylate at least a portion of $Ar_1$, in forming a hydroxylated polymer with ortho hydroxyl groups,
   c) forming a fiber from the hydroxylated polymer of step b),
   d) heating the fiber to form ring closure of at least a portion of ortho-hydroxyl groups.

2. The method of claim 1 wherein $Ar_1$ is:

3. The method of claim 2 wherein $Ar_2$ is:

4. The method of claim 1 wherein $Ar_1$ is:

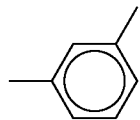

5. The method of claim 4 wherein $Ar_2$ is:

6. The method of claim 1 wherein the oxidizing agent is nitrosulfuric acid, lead tetracetate or sodium nitrate.

7. The method of claim 6 wherein the oxidizing agent is nitrosulfuric acid.

8. The method of claim 1 wherein the alkyl carboxylic acid is formic acid or acetic acid.

9. The method of claim 8 wherein the alkyl carboxylic acid is acetic acid.

10. The method of claim 1 wherein the heating is in a range from 170 to 280 degrees Celsius.

* * * * *